(12) United States Patent
Lee et al.

(10) Patent No.: US 12,216,510 B2
(45) Date of Patent: *Feb. 4, 2025

(54) FOLDABLE DISPLAY DEVICE WITH MOVABLE SUPPORT BODY

(71) Applicant: LG Display Co., Ltd., Seoul (KR)

(72) Inventors: Shinsuk Lee, Gimpo-si (KR); Seungo Jeon, Seoul (KR); Youngjoon Yun, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/532,938

(22) Filed: Dec. 7, 2023

(65) Prior Publication Data

US 2024/0103587 A1    Mar. 28, 2024

Related U.S. Application Data

(63) Continuation of application No. 17/528,878, filed on Nov. 17, 2021, now Pat. No. 11,886,255.

(30) Foreign Application Priority Data

Nov. 30, 2020  (KR) .................. 10-2020-0164381

(51) Int. Cl.
*G06F 1/16* (2006.01)

(52) U.S. Cl.
CPC .......... *G06F 1/1681* (2013.01); *G06F 1/1624* (2013.01); *G06F 1/1652* (2013.01)

(58) Field of Classification Search
CPC ..... G06F 1/1681; G06F 1/1652; G06F 1/1624
See application file for complete search history.

(56) References Cited

U.S. PATENT DOCUMENTS

| | | | |
|---|---|---|---|
| 9,348,450 B1 | 5/2016 | Kim | |
| 9,557,771 B2* | 1/2017 | Park | H04M 1/0237 |
| 9,791,892 B2 | 10/2017 | Park et al. | |
| 10,317,934 B2* | 6/2019 | Hampton | G06F 1/1601 |
| 10,930,883 B2* | 2/2021 | Park | H10K 50/8426 |
| 11,266,029 B2 | 3/2022 | Kim | |
| 11,539,024 B2 | 12/2022 | Park | |
| 11,886,255 B2* | 1/2024 | Lee | G06F 1/1637 |
| 2011/0063783 A1 | 3/2011 | Shim et al. | |
| 2012/0243207 A1 | 9/2012 | Wang et al. | |
| 2016/0109908 A1 | 4/2016 | Siddiqui | |
| 2019/0237532 A1 | 8/2019 | Ahn et al. | |

(Continued)

FOREIGN PATENT DOCUMENTS

| CN | 110415608 A | 11/2019 |
|---|---|---|
| CN | 111223402 A | 6/2020 |

(Continued)

*Primary Examiner* — James Wu
(74) *Attorney, Agent, or Firm* — Birch, Stewart, Kolasch & Birch, LLP

(57) ABSTRACT

A foldable display device includes a first casing and a second casing supporting a first area and a second area of a display panel, respectively, a support disposed between the first casing and the second casing, supporting the display panel based on the folding direction of the foldable display device, and including a support body which ascends toward the display panel during the out-folding operation, and descends toward a bottom face of the hinge cover during the in-folding operation.

17 Claims, 7 Drawing Sheets

(56) References Cited

U.S. PATENT DOCUMENTS

| | | |
|---|---|---|
| 2019/0250663 A1 | 8/2019 | Park |
| 2020/0293094 A1 | 9/2020 | Liu |
| 2022/0103670 A1 | 3/2022 | Liao |
| 2023/0126630 A1 | 4/2023 | Park |

FOREIGN PATENT DOCUMENTS

| | | |
|---|---|---|
| KR | 10-2016-0083608 A | 7/2016 |
| WO | WO 2019/225930 A1 | 11/2019 |

* cited by examiner

FOLDABLE DISPLAY DEVICE WITH MOVABLE SUPPORT BODY

CROSS-REFERENCE TO RELATED APPLICATION

This application is a Continuation Application of U.S. application Ser. No. 17/528,878, filed on Nov. 17, 2021, which claims a priority benefit under 35 U.S.C. § 119(a) of Korean Patent Application No. 10-2020-0164381 filed in the Republic of Korea on Nov. 30, 2020, where all these applications are hereby incorporated by reference into the present application.

BACKGROUND

Technical Field

The present disclosure relates to a foldable display device, and, more particularly, to a foldable display device that can be folded both in an in-foldable manner and an out-foldable manner.

Description of Related Art

Recently, portable terminals, such as wireless terminals, Personal Digital Assistants (PDA), Portable Multimedia Players (PMPs), and electronic notebooks have become smaller in size for convenience in portability. However, since a user wants to receive various information, such as text information, a moving image, a still image, an MP3, a game, etc., on a screen of a portable terminal, there is an increasing demand for increase the screen size.

In order to enlarge the screen while maintaining the portability of the portable terminal, development of a foldable display device using a flexible display panel that can be bent or folded is in progress. This foldable display device can be applied not only to mobile devices such as mobile phones, electronic books, and electronic newspapers, but also to various fields, such as televisions and monitors, but is not limited thereto.

SUMMARY OF THE DISCLOSURE

A conventional foldable display device is implemented only in an in-foldable manner in which the device is folded such that folded display panel portions face toward each other, or only an out-foldable manner in which the device is folded such that folded display panel portions face outwardly (e.g., away from each other). However, there is a need for a foldable display device capable of implementing both an in-folding operation and an out-folding operation for various applications. Accordingly, the inventors of the present disclosure have invented a foldable display device that can be folded both in an in-foldable manner and an out-foldable manner.

Thus, a purpose of the present disclosure is to provide a foldable display device that can be folded in both in an in-foldable manner and an out-foldable manner.

Purposes according to the present disclosure are not limited to the above-mentioned purpose. Other purposes and advantages according to the present disclosure that are not mentioned can be understood based on following descriptions, and can be more clearly understood based on embodiments according to the present disclosure. Further, it will be easily understood that the purposes and advantages according to the present disclosure can be realized using means shown in the claims and combinations thereof.

In order to achieve the above-described purpose, a foldable display device according to an embodiment of the present disclosure includes a display panel having a first area, a second area, and a foldable area therebetween, a first casing and a second casing supporting a first area and a second area of a display panel, respectively, a support disposed between the first casing and the second casing, wherein the support is constructed for selectively supporting the display panel based on the folding direction, and a hinge cover for accommodating therein the support. The support includes a support body which ascends toward the display panel during the out-folding operation, and descends toward a bottom face of the hinge cover during the in-folding operation. Accordingly, the foldable display device according to an embodiment of the present disclosure can achieve the in-folding and out-folding operations.

A foldable display device according to another embodiment of the present disclosure includes a display panel having a foldable area; a first casing and a second casing to support the display panel, wherein the first casing and the second casing are coupled to each other via a hinge; a support coupled to the hinge to selectively support the display panel according to a folding direction of the foldable display device; and a hinge cover to accommodate therein the hinge and the support, wherein the support includes a support body, wherein the support body ascends toward the display panel during an out-folding operation of the foldable display device, and descends toward a bottom face of the hinge cover during an in-folding operation of the foldable display device.

A foldable display device according to yet another embodiment of the present disclosure includes a first casing supporting a first area of a display panel; a second casing accommodating a slidable plate and including a sliding-guiding groove to guide a slide movement of the slidable plate, wherein the slidable plate supports a second area of the display panel; a support disposed between the first casing and the second casing to selectively support the display panel according to a folding direction of the foldable display device; and a hinge cover to accommodate the support therein; wherein the support includes a support body, wherein the support body ascends toward the display panel during an out-folding operation of the foldable display device, and descends toward a bottom face of the hinge cover during an in-folding operation of the foldable display device.

According to the present disclosure, the display device can include the support body that moves up and down according to the folding direction of the first casing and the second casing. Thus, the display device can be capable of performing the in-folding and out-folding operations.

According to the present disclosure, the display device can include the support body that moves up and down according to the folding direction of the first casing and the second casing. Thus, the display panel can be stably supported in the unfolded state and the out-folded state.

According to the present disclosure, a slidable plate can be movably coupled to the second casing. Thus, in the out-folded state, stress applied to the display panel can be reduced.

Effects of the present disclosure are not limited to the above-mentioned effects, and other effects as not mentioned will be clearly understood by those skilled in the art from following descriptions.

DETAILED DESCRIPTION OF THE EMBODIMENTS

Figure 1:
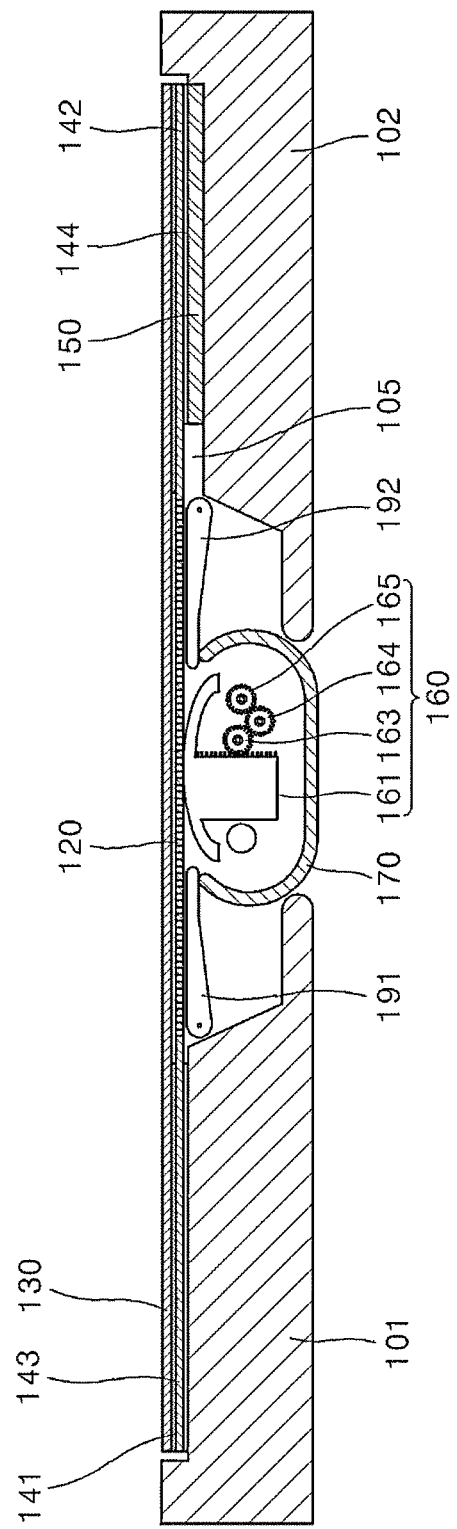
FIG. 1 is a side view of a foldable display device according to an embodiment of the present disclosure as viewed in an unfolded state.

Advantages and features of the present disclosure, and a method of achieving the Advantages and features will become apparent with reference to embodiments described later in detail together with the accompanying drawings. However, the present disclosure is not limited to the embodiments as disclosed below, but can be implemented in various different forms. Thus, these embodiments are set forth only to make the present disclosure complete, and to completely inform the scope of the disclosure to those of ordinary skill in the technical field to which the present disclosure belongs, and the present disclosure is only defined by the scope of the claims.

A shape, a size, a ratio, an angle, a number, etc., disclosed in the drawings for describing the embodiments of the present disclosure are exemplary, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure can be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements can modify the entire list of elements and can not modify the individual elements of the list. In interpretation of numerical values, an error or tolerance therein can occur even when there is no explicit description thereof.

In addition, it will also be understood that when a first element or layer is referred to as being present "on" a second element or layer, the first element can be disposed directly on the second element or can be disposed indirectly on the second element with a third element or layer being disposed between the first and second elements or layers. It will be understood that when an element or layer is referred to as being "connected to," or "coupled to" another element or layer, it can be directly on, connected to, or coupled to the other element or layer, or one or more intervening elements or layers can be present. In addition, it will also be understood that when an element or layer is referred to as being "between" two elements or layers, it can be the only element or layer between the two elements or layers, or one or more intervening elements or layers can also be present.

Further, as used herein, when a layer, film, region, plate, or the like is disposed "on" or "on a top" of another layer, film, region, plate, or the like, the former can directly contact the latter or still another layer, film, region, plate, or the like can be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former can directly contact the latter or still another layer, film, region, plate, or the like can be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after," "subsequent to," "before," etc., another event can occur therebetween unless "directly after," "directly subsequent" or "directly before" is indicated.

It will be understood that, although the terms "first," "second," "third," and so on can be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The features of the various embodiments of the present disclosure can be partially or entirely combined with each other, and can be technically associated with each other or operate with each other. The embodiments can be implemented independently of each other and can be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a foldable display device according to some embodiments of the present disclosure will be described.

Figure 2:
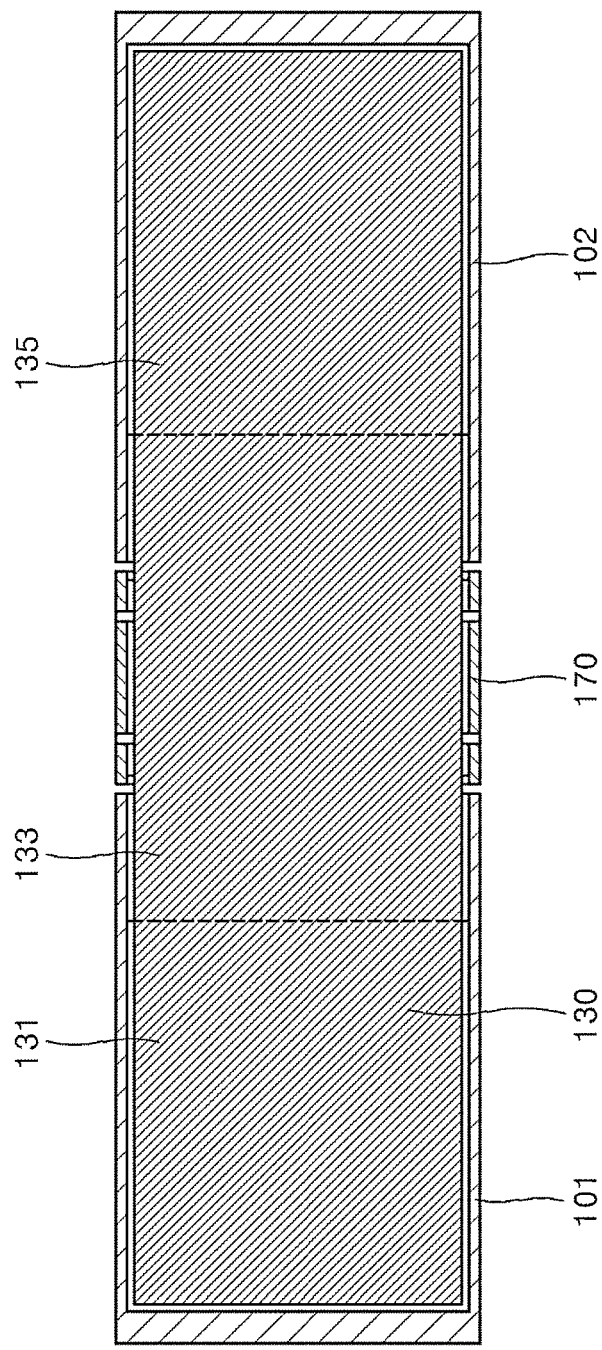
FIG. 2 is a plan view of a foldable display device according to an embodiment of the present disclosure as viewed in an unfolded state.
Figure 3:
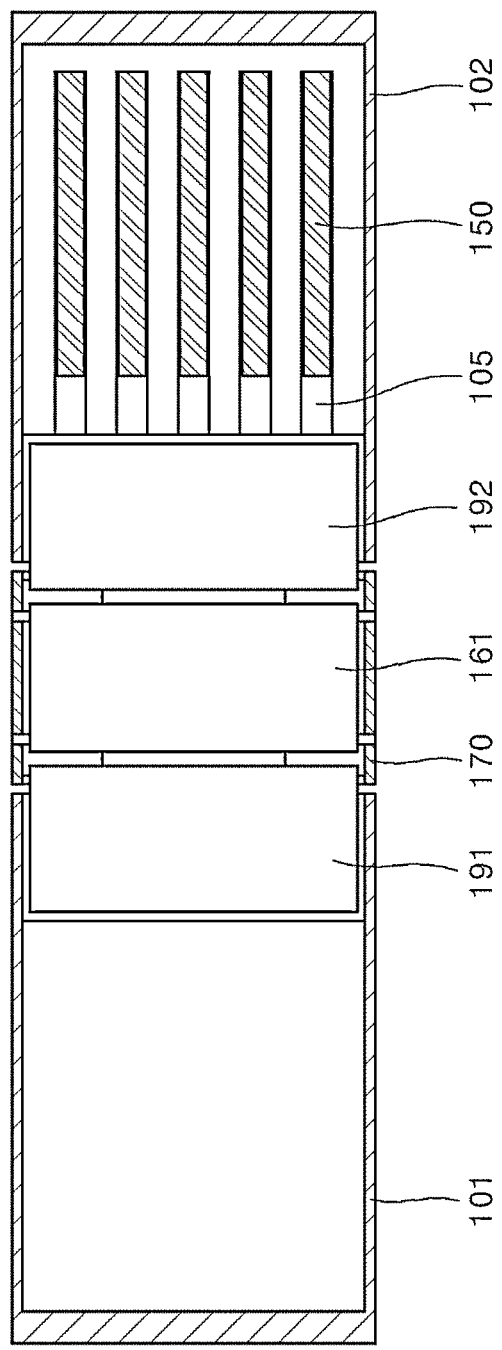
FIG. 3 is a plan view showing a state in which a display panel is removed while a foldable display device is unfolded according to an embodiment of the present disclosure.

FIG. 1 is a side view of a foldable display device according to an embodiment of the present disclosure as viewed in an unfolded state. FIG. 2 is a plan view of a foldable display device according to an embodiment of the present disclosure as viewed in an unfolded state. FIG. 3 is a plan view showing a state in which a display panel is removed while a foldable display device is unfolded according to an embodiment of the present disclosure.

Referring to FIG. 1, FIG. 2 and FIG. 3, the foldable display device according to an embodiment of the present disclosure includes a first casing 101, a second casing 102, a support plate 120, a display panel 130, a slidable plate 150, a support 160, a hinge cover 170, a first pivoting plate 191 and a second pivoting plate 192.

The foldable display device includes the display panel 130 having a first area 131, a second area 135 and a foldable area 133 therebetween, the first casing 101 supporting the first area 131 of the display panel 130, the second casing 102 supporting the second area 135 of the display panel 130, the support 160 placed between the first casing and the second casing to selectively support the display panel 130 according to a folding direction, and the hinge cover 170 that accommodates the support 160 therein. The support 160 includes a support body 161 which ascends toward the display panel 130 during the out-folding operation, and descends toward a bottom face of the hinge cover 170 during the in-folding operation.

An entire area of the display panel 130 can be divided into the first area 131, the second area 135, and the foldable area 133. The first area 131 can be defined as a partial area of the display panel 130 located on one side (e.g., a first side) of the foldable area 133. The second area 135 can be defined as a partial area of the display panel 130 located on an opposite side (e.g., a second side opposite to the first side) of the foldable area 133. When the display panel 130 is unfolded into a flat state, the first area 131, the second area 135, and the foldable area 133 constitute a single display area, thereby providing a wide screen.

The display panel 130 can be embodied as a flexible display panel using a flexible substrate. In one example, the display panel 130 can include a flexible organic light-emitting display panel, a flexible electrophoretic display panel, a flexible liquid crystal display panel, or a flexible electro-wetting display panel.

The display panel 130 can include a flexible pixel array substrate having an active matrix type pixel array, and an encapsulating member protecting the pixel array. The flexible pixel array substrate can be made of a plastic material or can be made of a metal foil. For example, the plastic flexible pixel array substrate can be made of one selected from polyimide (PI), polyethylene terephthalate (PET), polyethylenapthanate (PEN), polycarbonate (PC), polynorbornene (PNB), and polyethersulfone (PES). The pixel array includes a plurality of pixels in each pixel area adjacent to each of intersections between a plurality of gate lines and a plurality of data lines. The pixel includes a display element that displays an image corresponding to an image signal. In this connection, the display element can be embodied as an organic light-emitting element, a liquid crystal display element, an electrophoretic element, or an electro-wetting display element. When the display element is embodied as an organic light-emitting element or an electrophoretic element, an encapsulating member according to one example can be formed on a flexible substrate to cover the pixel array, and can be embodied as a flexible encapsulating substrate or a flexible encapsulation layer. When the display element is embodied as a liquid crystal display element, an electro-wetting display element, or an electrophoretic element, an encapsulating member according to another example can be embodied as a flexible color filter substrate including a color filter corresponding to a pixel.

Additionally, the display panel 130 can further include a polarizing film attached to the encapsulating member. However, the polarizing film can be omitted depending on an image rendering scheme of the display panel 130.

In one example, the foldable display device according to an embodiment of the present disclosure can be configured to further include a touch screen for a user interface using a user's touch. The touch screen can be attached to the display panel 130 or embedded in the display panel 130 together with a pixel array.

The first area 131 of the display panel 130 is supported by the first casing 101 while the first area 131 of the display panel 130 is attached to a partial area of the support plate 120 via a first adhesive member 141, and a partial area of the support plate 120 is attached to the first casing 101 via a third adhesive member 143. The second area 135 of the display panel 130 is supported by the slidable plate 150 while the second area 135 of the display panel 130 is attached to a partial area of the support plate 120 via a second adhesive member 142, and a partial area of the support plate 120 is attached to the slidable plate 150 via a fourth adhesive member 144. The slidable plate 150 is supported by the second casing 102. Thus, the second area 135 of the display panel 130 is supported by the second casing 102 via the slidable plate 150.

In an unfolded state of the foldable display device, the foldable area 133 of the display panel 130 can be supported by the support 160, the first pivoting plate 191, and the second pivoting plate 192 via the support plate 120. The foldable area 133 of the display panel 130 may not be attached to the support plate 120. This is intended to maintain a function of supporting the display panel 130 while reducing a stress applied to the display panel 130 during the in-folding and out-folding operations. The thinner the first adhesive member 141 and the second adhesive member 142, a smaller a spacing between the foldable area 133 of the display panel 130 and the support plate 120.

The foldable area 133 of the display panel 130 can be divided into a central area and a first peripheral area and a second peripheral area respectively arranged on both sides of the central area. The central area of the foldable area 133 of the display panel 130 can be supported by the support body 161 of the support 160. The first peripheral area of the foldable area 133 of the display panel 130 can be supported by the first pivoting plate 191. The second peripheral area of the foldable area 133 of the display panel 130 can be supported by the second pivoting plate 192. In this connection, one end of the first pivoting plate 191 and one end of the second pivoting plate 192 can be supported by the hinge cover 170. That is, the first pivoting plate 191 can be supported by a first side of the hinge cover 170 and the second pivoting plate 192 can be supported by a second side of the hinge cover 170 opposite to the first side of the hinge cover 170. The first pivoting plate 191 and the second pivoting plate 192 are respectively arranged on both sides of the support 160. The first pivoting plate 191 and the second pivoting plate 192 together with the support 160 can support the foldable area 133 of the display panel 130.

Alternatively, in an embodiment of the present invention, the support plate 120 can be omitted. Accordingly, the first area 131 of the display panel 130 is supported by the first casing 101 while the first area 131 of the display panel 130 is directly attached to the first casing 101 via the first adhesive member 141. The second area 135 of the display panel 130 is supported by the slidable plate 150 while the second area 135 of the display panel 130 is attached to the slidable plate 150 via the second adhesive member 142. The slidable plate 150 is supported by the second casing 102. Thus, the second area 135 of the display panel 130 is supported by the second casing 102 via the slidable plate 150. In an unfolded state of the foldable display device, the foldable area 133 of the display panel 130 can be supported by the support 160, the first pivoting plate 191, and the second pivoting plate 192.

The first casing 101 can accommodate therein the first pivoting plate 191. In this connection, an opposite end of the first pivoting plate 191 opposite to one end of the first pivoting plate 191 supported by the hinge cover 170 can be pivotably coupled to an inner end area of the first casing 101 via a fastening member such as a pin. That is, a first end of the first pivoting plate 191 can be connected to an inner area of the first casing 101 via a fastening member, and a second end of the first pivoting plate 191, opposite to the first end of the first pivoting plate 191, can be supported by the hinge cover 170 (e.g., a first end of the hinge cover 170). The first pivoting plate 191 can pivot inside the first casing 101 according to a pivoting motion of the first casing 101. The second casing 102 can accommodate the second pivoting plate 192 therein. In this connection, an opposite end of the second pivoting plate 192 opposite to one end of the second pivoting plate 192 supported by the hinge cover 170 can be pivotably coupled to an inner end area of the second casing 102 via a fastening member such as a pin. That is, a first end of the second pivoting plate 192 can be connected to an inner area of the second casing 102 via a fastening member, and a second end of the second pivoting plate 192, opposite to the first end of the second pivoting plate 192, can be supported by the hinge cover 170 (e.g., a second end of the hinge cover 170). The second pivoting plate 192 can pivot inside the second casing 102 according to a pivoting motion of the second casing 102. The inner end area of the first casing 101 can include a space to allow the first pivoting plate 191 to pivot, while the inner end area of the second casing 102 can include a space to allow the second pivoting plate 192 to pivot. The first casing 101 and second casing 102 can be folded or unfolded while pivoting around the hinge cover 170. Each of the inner end area of the first casing 101 and the inner end area of the second casing 102 can refer to an area adjacent to the hinge cover 170. When the foldable display device is unfolded, the inner end area of the first casing 101 and the inner end area of the second casing 102 can be disposed adjacent to each other. In this context, when the foldable display device is unfolded, an outer end area of the first casing 101 and an outer end area of the second casing 102 can be far away from each other.

The second casing 102 can accommodate the slidable plate 150 therein and can include a sliding-guiding groove 105 to guide a slide movement of the slidable plate 150. A plurality of slidable plates 150 can be provided and a plurality of sliding-guiding grooves 105 can be provided. The slidable plate 150 can slide freely along a guide rail of the sliding-guiding groove 105 in a lateral direction, that is perpendicular to a vertical direction in which the support body 161 moves. The slidable plate 150 can slide within the sliding-guiding groove 105 to reduce the stress applied to the foldable area 133 of the display panel 130 during the out-folding operation.

The support 160 can further include three driving gears 163, 164, and 165 that rotate while meshing with each other to lift up or lower down the support body 161. The support body 161 can ascend or descend according to a rotation direction of one of the three driving gears 163, 164, and 165. That is, the support body 161 includes a linear gear/rack gear that can directly engage the first driving gear 163, the first driving gear 163 directly engages the second driving gear 164, and the second driving gear 164 directly engages the third driving gear 165. Based on the unfolded state, the support body 161 ascends toward the display panel 130 as the first driving gear 163 rotates in the clockwise direction during the out-folding operation. During the in-folding operation, as the first driving gear 163 rotates in a counter-clockwise direction, the support body 161 descends toward the bottom face of the hinge cover 170. A detailed structure of the support body 161 will be described later with reference to FIG. 6.

Figure 4:
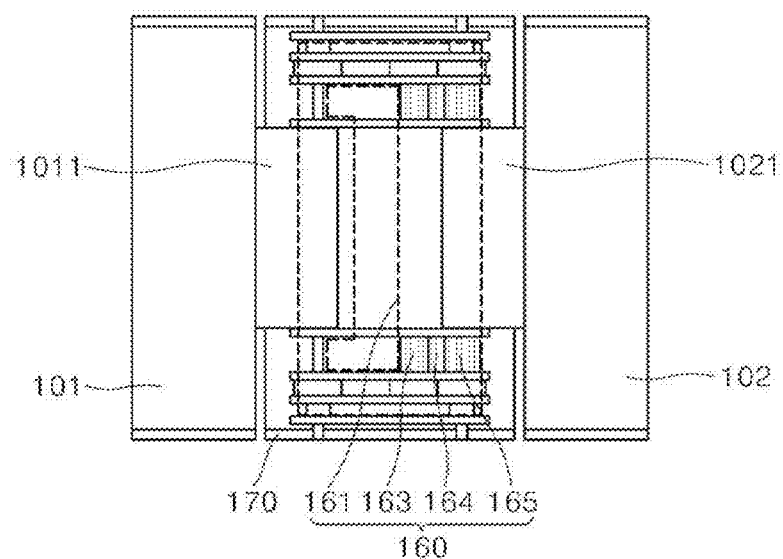
FIG. 4 and FIG. 5 are plan views for illustrating a support of a foldable display device according to an embodiment of the present disclosure.
Figure 5:
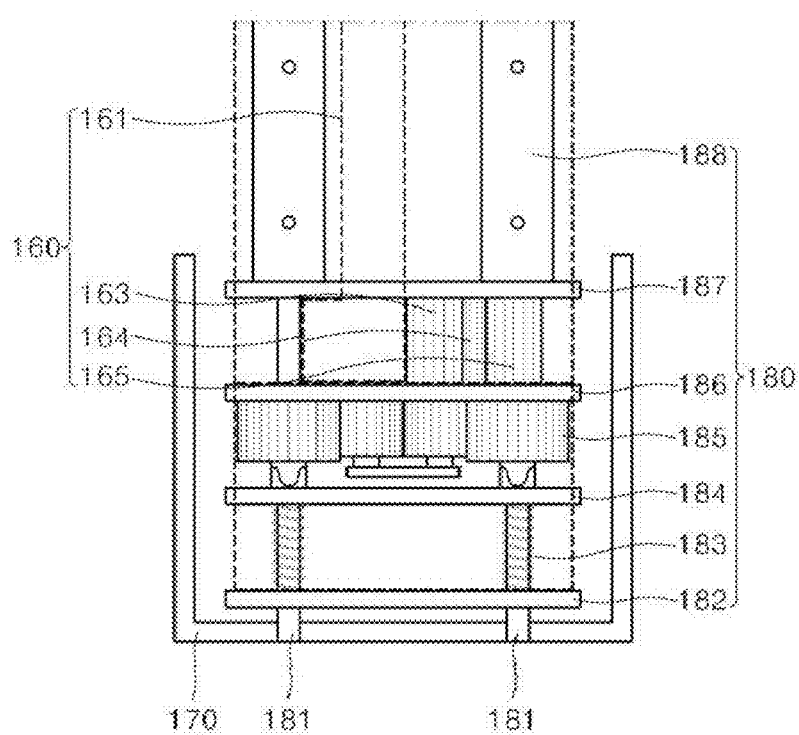
Figure 6:
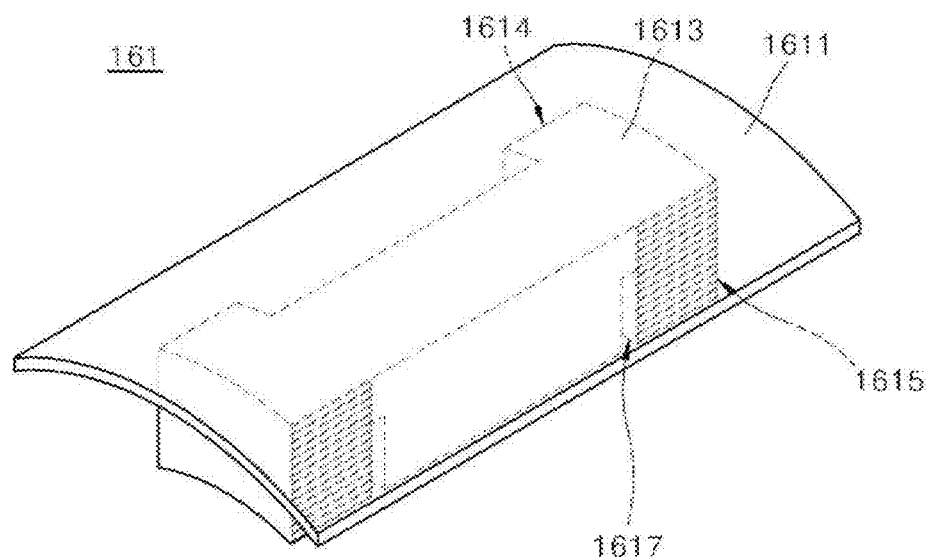
FIG. 6 is a perspective view showing a movable support body of a foldable display device according to an embodiment of the present disclosure.

FIG. 4 and FIG. 5 are plan views for illustrating a support of a foldable display device according to an embodiment of the present disclosure. FIG. 6 is a perspective view showing a support body of a foldable display device according to an embodiment of the present disclosure.

Referring to FIG. 4 and FIG. 5, the support 160 can be coupled to the hinge 180. As previously described, the support 160 includes the support body 161, and the first to third driving gears 163, 164, and 165. The hinge 180 includes a pair of hinge shafts 181, a first fixing plate 182, a pair of springs 183, a second fixing plate 184, hinge gears 185, a third fixing plate 186, a fourth fixing plate 187, and a pair of pivoting plates 188. A combination of the support 160, the hinge cover 170 and the hinge 180 can be referred to as a hinge assembly.

The first to third driving gears 163, 164, and 165 of the support 160 can be disposed between the third fixing plate 186 and the fourth fixing plate 187 of the hinge 180. The third driving gear 165 is coupled to the hinge shaft 181 so that the third driving gear 165 can rotate in a direction corresponding to a rotation direction of the hinge shaft 181. The introduction of the second driving gear 164 can allow the first driving gear 163 to rotate in the same direction as that of the third driving gear 165. When the first casing 101 and the second casing 102 are folded into an in-folded state, the hinge shaft 181 rotates in the counterclockwise direction. Accordingly, the third driving gear 165 and the first driving gear 163 rotates in the counterclockwise direction. As the first driving gear 163 rotates in a counterclockwise direction, the support body 161 descends in the downward direction, e.g., toward the bottom face of the hinge cover 170. Conversely, when the first casing 101 and the second casing 102 are folded into an out-folded state, the hinge shaft 181 rotates in the clockwise direction. Accordingly, the third driving gear 165 and the first driving gear 163 rotate in the clockwise direction. As the first driving gear 163 rotates in the clockwise direction, the support body 161 ascends in the upward direction, e.g., toward the display panel 130.

The spring 183 can be coupled to each hinge shaft 181 and can disposed between the first fixing plate 182 and the second fixing plate 184. Even while the hinge gears 185 are rotating, the second fixing plate 184 can remain in close contact with the hinge gears 185 due to an elastic force of the spring 183.

The second fixing plate 184 and the hinge gears 185 can be connected to each other via a cam mechanism, and thus can allow a pivoted position of the first casing 101 and the second casing 102 to be maintained at a pre-designed folding angle, for example, 0 degree (in-folded state), 30 degrees, 60 degrees, 90 degrees, 120 degrees, 150 degrees, 180 degrees, 210 degrees, 240 degrees, 270 degrees, 300 degrees, 330 degrees, and 360 degrees (out-folded state).

The hinge gears 185 can include a pair of main hinge gears respectively coupled to a pair of hinge shafts 181. The hinge gears 185 can further include auxiliary hinge gears disposed between and engaged with the main hinge gears.

A first fastener 1011 of the first casing 101 and a second fastener 1021 of the second casing 102 can be coupled to a pair of fastening plates 188 of the hinge 180, respectively. The fastening plate 188 can be fixed to the hinge shaft 181. Thus, the hinge shafts 181 rotate when the first casing 101 and second casing 102 are folded or unfolded. Furthermore, the first driving gear 163 can rotate by rotation of the hinge shaft 181 when the first casing 101 and second casing 102 are folded or unfolded, where rotation of one of the hinge shafts 181 causes rotation of the third driving gear 165, which causes rotation of the second driving gear 164, and rotation of the second driving gear 164 causes rotation of the first driving gear 163.

Referring to FIG. 6, one side wall of a lower portion of the support body 161 can have a rack gear 1615 meshing with an innermost of the three driving gears 163, 164, and 165 within the hinge cover 170, that is, the first driving gear 163. Two rack gears 1615 can be arranged and spaced from each other in a length direction of the side wall of a lower portion of the support body 161. Since the support body 161 includes the two rack gears 1615 spaced apart from each other in the length direction of the side wall thereof, the support body 161 can ascend or descend in a right standing manner while not being inclined in the length direction (e.g., while maintaining a constant lateral position). The opposite side wall of a lower portion of the support body 161 can have projections 1614 respectively opposite to the rack gears 1615. When the support body 161 ascends or descends, the projections 1614 of the support body 161 can be guided by the hinge shaft 181 (see FIG. 5). The rack gears 1615 on one side wall of a lower portion of the support body 161 can be guided by the first driving gear 163, while the projections 1614 on the opposite side wall of a lower portion of the support body 161 can be guided by the hinge shaft 181. Thus, the support body 161 can ascend or descend while not being inclined in a width direction. The lower portion of the support body 161 can have grooves 1617 defined therein adjacent to the rack gears 1615, respectively. When the support 160 is coupled to the hinge 180, the fourth fixing plate 187 can be fitted into the groove 1617.

The support body 161 includes a lower portion 1613 having one side wall and the opposite side wall, and an upper portion 1611 having a greater width than that of the lower portion 1613. The upper portion 1611 of the support body 161 can have a top face as a convex curved surface toward the display panel 130. When the top face of the upper portion 1611 of the support body 161 has a curved face, the top face can support the foldable area 133 of the display panel 130 to maintain a predefined curvature thereof in the out-folded state of the device. The upper portion 1611 can have a length greater than that of the lower portion 1613.

Figure 7:
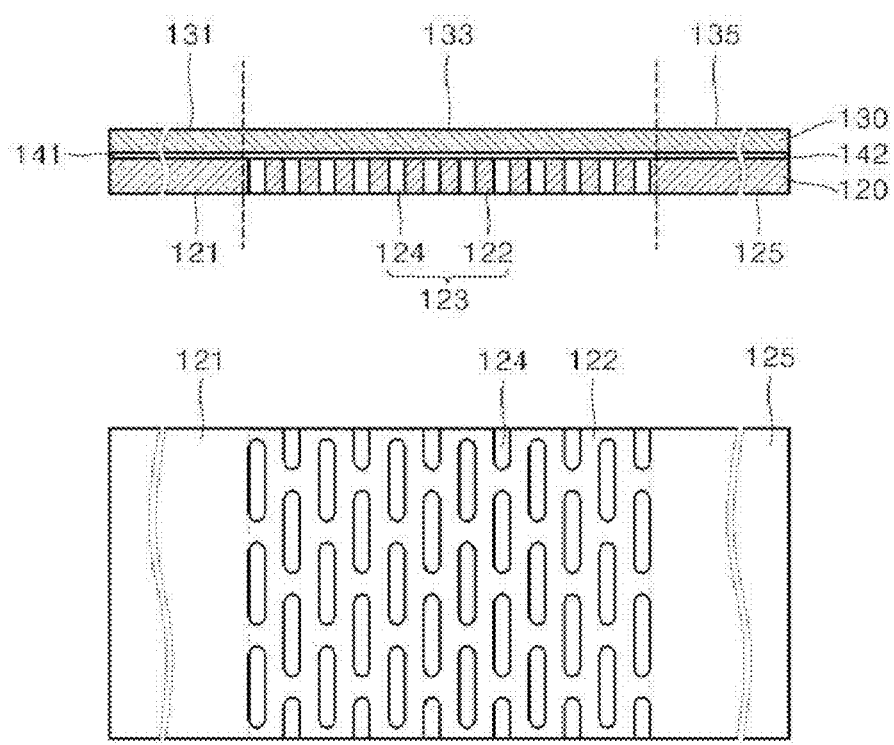
FIG. 7 is a drawing to illustrate a support plate of a foldable display device according to an embodiment of the present disclosure.

FIG. 7 is a drawing to illustrate a support plate of a foldable display device according to an embodiment of the present disclosure.

Referring to FIG. 7, the support plate 120 disposed between the display panel 130 and the first casing 101 and between the display panel 130 and the second casing 102 can include a foldable portion 123 corresponding to (e.g., overlapping) the foldable area 133 of the display panel 130, and can made of a metal and a polymer material, and first and second non-foldable portions 121 and 125 respectively corresponding to (e.g., overlapping) the first and second areas 131 and 135 of the display panel 130 and can made of a metal material. The foldable portion 123 of the support plate 120 includes a first foldable portion 122 having a plurality of holes and can made of a metal material and a second foldable portion 124 that can made of a polymer material filling the plurality of holes.

The foldable portion 123 of the support plate 120 may not be attached to the foldable area 133 of the display panel 130, while the first and second non-foldable portions 121 and 125 of the support plate 120 can be respectively attached to the bottom faces of the first and second areas 131 and 135 of the display panel 130. This configuration is intended to maintain a function of supporting the display panel 130 while reducing the stress applied to the display panel 130 during the in-folding and out-folding operations.

Figure 8:
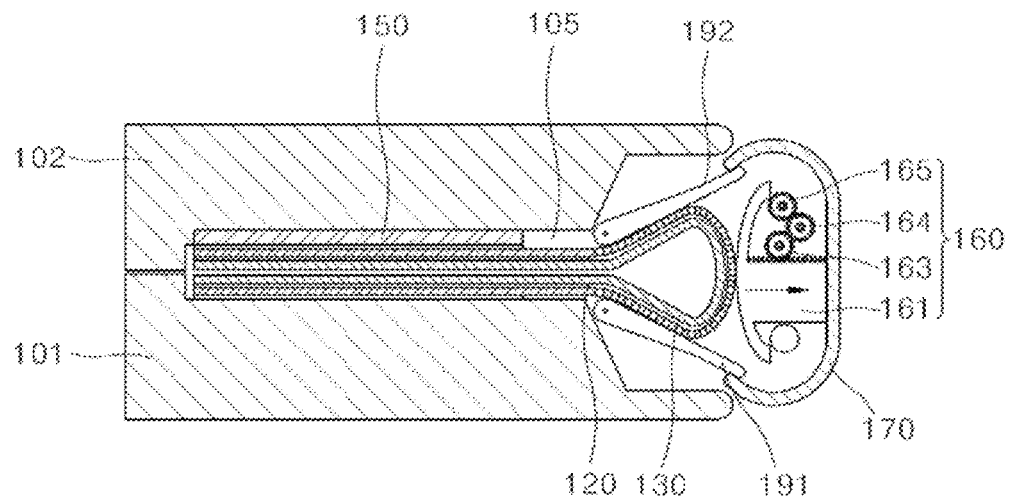
FIG. 8 is a side view of a foldable display device according to an embodiment of the present disclosure as viewed in an in-folded state.

FIG. 8 is a side view of a foldable display device according to an embodiment of the present disclosure as viewed in an in-folded state.

In the in-folded state, the foldable area 133 of the display panel 130 is gently bent into a 'Ω' shape as received in a space created when the support body 161 descends toward the bottom face of the hinge cover 170 and the first and second pivoting plates 191 and 192 pivot. The foldable area 133 can contact the first and second pivoting plates 191 and 192 and the support body 161 in the in-folded state. Distal ends of the first and second pivoting plates 191 and 192 can be respectively in contact with distal ends of the hinge cover 170, and can be placed between the distal ends of the hinge cover 170 and both edges of the upper portion of the support body 161 in the in-folded state.

Figure 9:
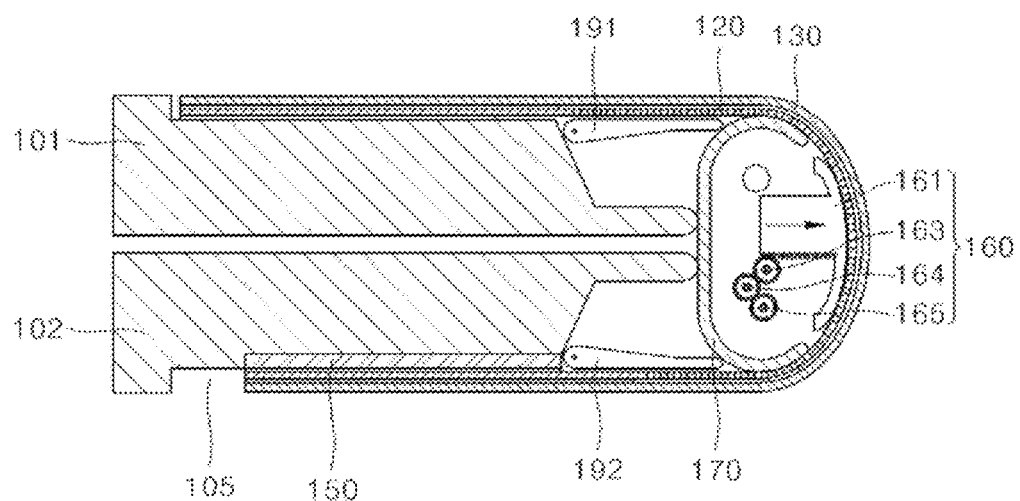
FIG. 9 is a side view of a foldable display device according to an embodiment of the present disclosure as viewed in an out-folded state.

FIG. 9 is a side view of a foldable display device according to an embodiment of the present disclosure as viewed in the out-folded state.

In the out-folded state, the foldable area 133 of the display panel 130 can be folded in a state supported by the support body 161 as the support body 161 ascends towards the display panel 130. The top face of the support body 161 is formed as a predefined curved face, so that the foldable area of the display panel 130 can be supported by the top face of the support body 161 such that the predefined curvature of the foldable area can be maintained. Therefore, the stress generated to the display panel 130 due to the non-uniform curvature of the display panel 130 can be minimized. The first and second pivoting plates 191 and 192 can move along an outer surface of the hinge cover 170 while supporting the display panel 130 in the out-folded state.

Figure 10:
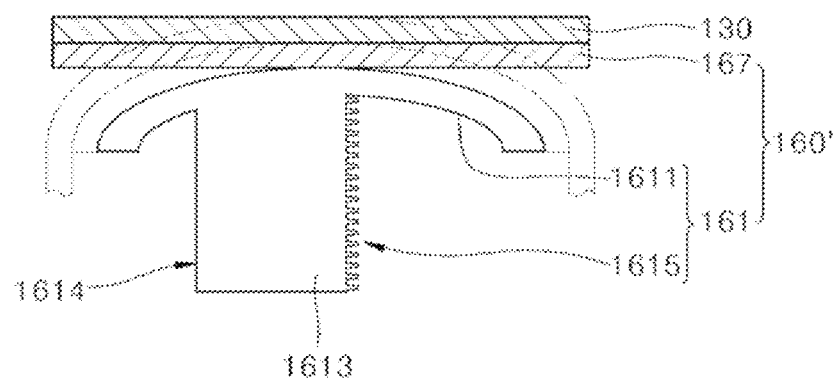
FIG. 10 is a perspective view for illustrating a support of a foldable display device according to an embodiment of the present disclosure.

FIG. 10 is a perspective view for illustrating a support of a foldable display device according to another embodiment of the present disclosure.

Referring to FIG. 10, a support 160' can further include an elastic plate 167 that is partially coupled to the upper portion 1611 of the support body 161. The elastic plate 167 has a flat shape during the unfolding operation, and is bent during the out-folding operation and in contact with the top face of the upper portion 1611. The elastic plate 167 can support the foldable area 133 of the display panel 130 over a wider area thereof in the unfolded state. During the out-folding operation, the foldable area 133 of the display panel 130 can be supported by the elastic plate 167 such that the predefined curvature of the foldable area is maintained. That is, during the out-folding operation, the elastic plate 167 is deformed against the upper portion 1611 of the support body 161 such that the elastic plate 167 has a convexly curved shape corresponding to the convexly curved shape of the top surface of the upper portion 1611 of the support body 161.

Figure 11:
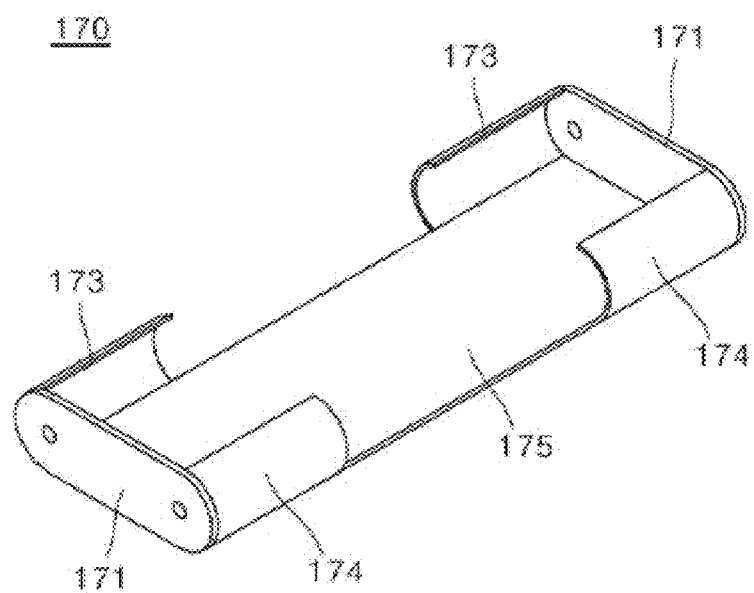
FIG. 11 is a perspective view showing a hinge cover of a foldable display device according to an embodiment of the present disclosure.

FIG. 11 is a perspective view showing a hinge cover of a foldable display device according to an embodiment of the present disclosure.

Referring to FIG. 11, the hinge cover 170 includes a bottom face 175, a pair of hinge shaft supports 171 that respectively extend vertically from both sides in a length direction of the bottom face 175, and first and second side curved portions 173 and 174 respectively on both sides in a width direction of the bottom face 175. A middle portion of each of the first and second side portions 173 and 174 can be removed away so that the first fastener 1011 of the first casing 101 and the second fastener 1021 of the second casing 102 can be pivotally coupled to the fastening plates 188 of the hinge 180. The first and second side portions 173 and 174 can be curved and thus can easily support the distal ends of the first and second pivoting plates 191 and 192 during the unfolding and in-folding operations, or can allow the first and second pivoting plates 191 and 192 to easily move along the surfaces of the first and second side portions 173 and 174 during the out-folding operation.

An embodiment of the present disclosure can be described as follows.

A first aspect of the present disclosure provides a foldable display device comprising: a display panel having a first area, a second area, and a foldable area therebetween; a first casing supporting the first area of the display panel; a second casing supporting the second area of the display panel; a support disposed between the first casing and the second casing to selectively support the display panel according to a folding direction of the foldable display device; and a hinge cover to accommodate the support therein; wherein the support includes a support body, wherein the support body ascends toward the display panel during an out-folding operation of the foldable display device, and descends toward a bottom face of the hinge cover during an in-folding operation of the foldable display device.

In one implementation of the first aspect, the support further includes three driving gears rotating in engagement with each other to lift up or lower down the support.

In one implementation of the first aspect, the support body has a lower portion, wherein a rack gear is formed on one side wall of the lower portion and meshes with one of the three driving gears.

In one implementation of the first aspect, the support body has a lower portion and an upper portion having a greater width than a width of the lower portion, wherein the upper portion of the support has a top face convexly curved toward the display panel.

In one implementation of the first aspect, the support further includes an elastic plate partially coupled to the upper portion of the support, wherein the elastic plate has a flat shape during an unfolding operation of the foldable display device and is bent to be in contact with the top face of the upper portion during the out-folding operation.

In one implementation of the first aspect, the foldable display device further comprises a hinge connecting the first casing and the second casing to each other, wherein the hinge includes: a pair of hinge shafts respectively coupled to the first casing and the second casing; and a pair of gears rotatably and respectively coupled to the pair of hinge shafts.

In one implementation of the first aspect, a driving gear of the three driving gears farthest from the support body is coupled to the hinge shaft and rotates under rotation of the hinge shaft.

In one implementation of the first aspect, one side wall of a lower portion of the support is guided by one of the driving gears, while the opposite side wall of a lower portion of the support is guided by the hinge shaft.

In one implementation of the first aspect, the foldable display device further comprises a support plate disposed between the display panel and the first casing, and between the display panel and the second casing, wherein the support plate includes: a foldable portion corresponding to the foldable area of the display panel and made of a combination of a metal material and a polymer material; and a first non-foldable portion corresponding to the first area of the display panel and a second non-foldable portion corresponding to the second area of the display panel, and the first non-foldable portion and the second non-foldable portion are made of a metal material.

In one implementation of the first aspect, the foldable portion of the support plate is not attached to the foldable area of the display panel, while the first non-foldable portion of the support plate is attached to the first area of the display panel and the second non-foldable portion of the support plate is attached to the second area of the display panel.

A second aspect of the present disclosure provides a foldable display device comprising: a display panel having a foldable area; a first casing and a second casing to support the display panel, wherein the first casing and the second casing are coupled to each other via a hinge; a support coupled to the hinge to selectively support the display panel according to a folding direction of the foldable display device; and a hinge cover to accommodate therein the hinge and the support, wherein the support includes a support body, wherein the support body ascends toward the display panel during an out-folding operation of the foldable display device, and descends toward a bottom face of the hinge cover during an in-folding operation of the foldable display device.

In one implementation of the second aspect, the support further includes three driving gears rotating in engagement with each other to lift up or lower down the support, wherein the support body has a lower portion, wherein a rack gear is formed on one side wall of the lower portion and meshes with one of the three driving gears.

In one implementation of the second aspect, the support body has a lower portion and an upper portion having a greater width than a width of the lower portion, wherein the upper portion of the support has a top face convexly curved toward the display panel.

In one implementation of the second aspect, the support further includes an elastic plate partially coupled to the upper portion of the support, wherein a shape of the elastic plate varies based on a folded state of the foldable display device.

In one implementation of the second aspect, the hinge includes: a pair of hinge shafts respectively coupled to the first casing and the second casing; and a pair of gears rotatably and respectively coupled to the pair of hinge shafts.

In one implementation of the second aspect, a driving gear of the three driving gears farthest from the support body is coupled to the hinge shaft and rotates under rotation of the hinge shaft.

In one implementation of the second aspect, one side wall of the lower portion of the support is guided by one of the driving gears, while the opposite side wall of the lower portion of the support is guided by the hinge shaft.

A third aspect of the present disclosure provides a foldable display device comprising: a first casing supporting a first area of a display panel; a second casing accommodating a slidable plate and including a sliding-guiding groove to guide a slide movement of the slidable plate, wherein the slidable plate supports a second area of the display panel; a support disposed between the first casing and the second casing to selectively support the display panel according to a folding direction of the foldable display device; and a hinge cover to accommodate the support therein; wherein the support includes a support body, wherein the support body ascends toward the display panel during an out-folding operation of the foldable display device, and descends toward a bottom face of the hinge cover during an in-folding operation of the foldable display device.

Although the embodiments of the present disclosure have been described in more detail with reference to the accompanying drawings, the present disclosure is not necessarily limited to these embodiments. The present disclosure can be implemented in various modified manners within the scope not departing from the technical idea of the present disclosure. Accordingly, the embodiments disclosed in the present disclosure are not intended to limit the technical idea of the present disclosure, but to describe the present disclosure. The scope of the technical idea of the present disclosure is not limited by the embodiments. Therefore, it should be understood that the embodiments as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. A foldable display device, comprising:
a display panel having a first area, a second area, and a foldable area between the first area and the second area;
a first casing supporting the first area of the display panel;
a second casing supporting the second area of the display panel and being spaced from the first casing;
a support disposed between the first casing and the second casing to support the display panel; and
a hinge cover accommodating the support,
wherein the support includes a support body that is configured to ascend toward the display panel during an out-folding operation of the foldable display device, and descend toward a bottom face of the hinge cover during an in-folding operation of the foldable display device,
wherein the foldable display device further comprises a support plate, the support plate including a foldable portion overlapping the foldable area of the display panel and configured to fold in response to the out-folding operation and in response to the in-folding operation,
wherein the foldable portion includes a plurality of holes,
wherein the foldable portion of the support plate is not attached to the foldable area of the display panel, and
wherein an upper portion of the support body has a greater width than a lower portion of the support body, the upper portion of the support body being configured to contact the support plate, and the lower portion of the support body including a rack gear.

2. The foldable display device of claim 1, wherein the upper portion of the support body has a top face convexly curved toward the display panel with a fixed curvature.

3. The foldable display device of claim 2, wherein the support further includes at least two driving gears rotating in engagement with each other to lift up or lower down the support body.

4. The foldable display device of claim 3, wherein the rack gear meshes with a first gear among the at least two driving gears.

5. The foldable display device of claim 3, wherein the foldable display device further comprises a hinge connecting the first casing to the second casing, and
wherein the hinge includes:
a pair of hinge shafts respectively coupled to the first casing and the second casing and;
a pair of hinge gears respectively rotatably coupled to the pair of hinge shafts.

6. The foldable display device of claim 5, wherein the at least two driving gears includes three driving gears, and
wherein a third driving gear among the three driving gears farthest from the support body is coupled to a first hinge shaft among the pair of hinge shafts and is configured to rotate via rotation of the first hinge shaft.

7. The foldable display device of claim 6, wherein a first side wall of the lower portion of the support body is guided by a first driving gear among the three driving gears, and a second opposite side wall of the lower portion of the support body opposite to the first side wall of the lower portion of the support body is guided by a second hinge shaft among the pair of hinge shafts.

8. The foldable display device of claim 1, wherein the support plate is disposed between the display panel and the first casing, and disposed between the display panel and the second casing, and
wherein the support plate further includes at least one non-foldable portion overlapping one of the first area of the display panel and the second area of the display panel.

9. The foldable display device of claim 8, wherein the at least one non-foldable portion of the support plate is attached to the one of the first area of the display panel and the second area of the display panel.

10. A foldable display device, comprising:
a display panel having a foldable area;
a first casing supporting the display panel;
a second casing supporting the display panel and spaced from the first casing;
a hinge coupling the first casing to the second casing;
a support coupled to the hinge to selectively support the display panel and including a support body configured to ascend toward the display panel during an out-folding operation of the foldable display device, and descend away from the display panel during an in-folding operation of the foldable display; and
a support plate including a foldable portion overlapping the foldable area of the display panel and configured to fold in response to the out-folding operation and in response to the in-folding operation,
wherein the foldable portion includes a plurality of holes,
wherein the foldable portion of the support plate is not attached to the foldable area of the display panel, and wherein an upper portion of the support body has a greater width than a lower portion of the support body, the upper portion of the support body being configured to contact the support plate, and the lower portion of the support body including a rack gear.

11. The foldable display device of claim 10, wherein the upper portion of the support body has a top face convexly curved toward the display panel with a fixed curvature.

12. The foldable display device of claim 11, wherein the support further includes:
   at least two driving gears rotating in engagement with each other to lift up or lower down the support body, and
   wherein the rack gear is configured to mesh with a first gear among the at least two driving gears.

13. The foldable display device of claim 12, wherein the hinge includes:
   a pair of hinge shafts respectively coupled to the first casing and the second casing and;
   a pair of hinge gears respectively rotatably coupled to the pair of hinge shafts.

14. The foldable display device of claim 13, wherein the at least two driving gears includes three driving gears, and
   wherein a third driving gear among the three driving gears farthest from the support body is coupled to a first hinge shaft among the pair of hinge shafts and is configured to rotate via rotation of the first hinge shaft.

15. The foldable display device of claim 14, wherein a first side wall of the lower portion of the support body is guided by a first driving gear among the three driving gears and a second side wall of the lower portion of the support body opposite to the first side wall of the lower portion of the support body is guided by a second hinge shaft among the pair of hinge shafts.

16. The foldable display device of claim 10, further comprising:
   a hinge cover covering the support; and
   a first pivoting plate disposed between the first casing and the display panel and configured to pivot to support the foldable area of the display panel during the out-folding operation and the in-folding operation,
   wherein one end of the first pivoting plate is supported by the hinge cover.

17. The foldable display device of claim 16, further comprising a second pivoting plate disposed between the second casing and the display panel and configured to pivot to support the foldable area of the display panel during the out-folding operation and the in-folding operation,
   wherein the first pivoting plate is disposed laterally between the support body and the first casing, and
   wherein the second pivoting plate is disposed laterally between the support body and the second casing.

* * * * *